(12) United States Patent
Preist et al.

(10) Patent No.: US 7,779,257 B2
(45) Date of Patent: Aug. 17, 2010

(54) SYSTEM AND METHOD FOR CONSTRAINT RESOLUTION

(75) Inventors: Christopher William Preist, Bristol (GB); Javier Esplugas Cuadrado, Madrid las Rozas (ES); Caroline Kudla, Bristol (GB); David Trastour, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1288 days.

(21) Appl. No.: 11/294,604

(22) Filed: Dec. 6, 2005

(65) Prior Publication Data

US 2006/0155996 A1    Jul. 13, 2006

(51) Int. Cl.
*H04L 9/32* (2006.01)
(52) U.S. Cl. ......................................... 713/169; 380/44
(58) Field of Classification Search ........................ None
See application file for complete search history.

(56) References Cited

U.S. PATENT DOCUMENTS

| | | | | |
|---|---|---|---|---|
| 4,361,729 A | * | 11/1982 | Barnes et al. | 380/254 |
| 4,493,949 A | * | 1/1985 | Retallack et al. | 370/362 |
| 4,797,920 A | * | 1/1989 | Stein | 705/72 |
| 4,935,956 A | * | 6/1990 | Hellwarth et al. | 379/144.02 |
| 5,001,752 A | * | 3/1991 | Fischer | 713/178 |
| 5,241,586 A | * | 8/1993 | Wilson et al. | 379/88.11 |
| 5,987,140 A | * | 11/1999 | Rowney et al. | 705/79 |
| 6,141,750 A | * | 10/2000 | Micali | 713/168 |
| 2004/0139095 A1 | * | 7/2004 | Trastour et al. | 707/100 |

FOREIGN PATENT DOCUMENTS

WO    02/21789 A2    3/2002

OTHER PUBLICATIONS

Information Sharing Across Private Databases, Jun. 9-12, 2003, San Diego, CA, SIGMOD 2003 Copyright 2003 ACM 1-58113-634-x/03/06.*
Agrawal, Rakesh, "Information Sharing across Private Database," IBM Almaden Research Center, Sigmod 2003, Jun. 9-12, San Diego, CA.*

* cited by examiner

*Primary Examiner*—Kambiz Zand
*Assistant Examiner*—Dant B Shaifer Harriman (57) ABSTRACT

A method of determining the compatibility of respective information associated with at least two parties is described. The method comprises: a first and second party each expressing their respective information in an agreed format; processing the information according to a two-phase double-encryption process, in which the first party encrypts their information under a personalized first-phase procedure and sends the results to the second party and the second party encrypts their information under a personalized first-phase procedure and sends the results to the first party, the second party encrypting the encrypted information received from the first party under a personalized second-phase procedure to produce a double-encrypted result and the first party encrypting the encrypted information received from the second party under a personalized second-phase procedure to produce a double-encrypted result, the first- and second-phase procedures being chosen such that a given element of information will always yield the same unique double-encrypted result regardless of which party it originates from; and comparing each party's double-encrypted information to determine the compatibility of the information of each party.

27 Claims, 5 Drawing Sheets

SYSTEM AND METHOD FOR CONSTRAINT RESOLUTION

FIELD OF THE INVENTION

The present invention relates to a system and method for constraint resolution, and in particular to a system and method wherein constraints of different parties' systems may be resolved to thereby enable communication between the parties' systems, with the minimum amount of information being disclosed.

BACKGROUND OF THE INVENTION

In certain situations where parties wish to establish a communications link and to share digital information which they hold, there may be an incompatibility in the way in which the digital information and any labels for that information is expressed by each party. For example, two parties may each have a different title for the same item of information, with the net result that the equivalence of that piece of information is not recognised by the respective computer systems of those parties. This means that the parties cannot simply share the information in a straightforward manner as they would wish, for example by connecting their respective computer systems and allowing information to flow freely across the link.

Further problems can arise where parties wish to establish a link, for example, a communications link, wherein establishing that link involves ensuring not only that the same labels are used for each party's information, but also that the constraints on each party's system are compatible. For example, in the case of a communications link, a first party may be able to process lines of information which are 50 characters long, whereas a second party which desires to form a link with the first party may only be able to process lines of information which are 20 characters long. Furthermore, the second party may be able to process information represented in alphanumeric characters, whereas the first party may only be able to process information represented by integer numbers. Clearly, if the two parties are to be able to understand the information conveyed over a mutual communications link, they will need to identify their constraints to the other party e.g. they must inform the other party of the amount and type of information which they are able to process. In this example, for instance, after disclosing their constraints to each other, the parties may agree that they will only send information to each other in lines of no more than 20 integers.

Another exemplary situation wherein parties wish to establish a link would be in the case of three companies, A, B and C, who have decided that they will collaborate to manufacture a new product, namely a new type of sports car. Company A manufactures chassis and drivetrains, but by reason of the size of their factory, has the manufacturing constraint that it is only able to manufacture chassis of a length suitable for supporting car bodies between 1.5 and 2.5 metres long. Company B manufactures fibreglass car bodies governed by the manufacturing constraint that the bodies cannot be longer than 2 metres if they are to fit in Company B's car-body mould. Regardless of their length, however, the bodies produced by B have wheel arches sized to fit wheels up to 20 inches in diameter. Company C manufactures wheel axes with fitted alloy wheels and tires, which are constrained to be between 13 and 18 inches in diameter.

Having decided to make the vehicle, companies A, B and C first need to ensure that the terms by which they refer to their manufacturing product are understood and used commonly by all in their interaction. For example, the companies need to establish between themselves that by "drivetrain" Company A means an engine, gearbox and propshaft so that all parts are identified by all companies.

Then, the parties need to reveal their constraints to each other. As a result of revealing their constraints, Companies A and B agree that they will only produce cars of length 1.5 to 2 metres. Although Company C does have a manufacturing constraint, this does not affect companies A and B, and so Company C is free to manufacture wheels of the diameter of their choosing. With hindsight, Company C did not in fact need to disclose its constraints to A and B, and similarly A and B did not need to disclose their constraints to C as C is unaffected by them.

In certain situations, making disclosures of constraints to other parties may be undesirable where that information may be secret. For instance, in the example given above, a subsidiary of Company A may be considering manufacturing wheels. In the course of the disclosures made in establishing the manufacturing link between companies A, B and C, Company A has learnt that C can only produce wheels up to 18 inches in diameter, and can pass this information onto its subsidiary. The subsidiary can then conduct market research to see if there is a demand for wheels over 18 inches in diameter, and if it discovers that there is such a demand, will be able to enter the market without competition from C, thus exploiting C's inability to manufacture corresponding products.

Hence, information about processes can be commercially sensitive and parties would rather only disclose the minimum necessary, particularly at early stages in a potential link with another party.

Clearly another area of application of the present invention is in business to business (BTB) relationships where each company has its own systems for storing and processing information relevant to its business. Two or more companies may wish to collaborate on a project in which it would be useful to share information and resources between the companies, but for the various reasons described above various problems may be encountered in establishing the relationship.

In the past, attempts have been made to mitigate the problem by revealing all potentially relevant information and constraints etc. under mutually-signed Non Disclosure Agreements (NDAs), and then together determining if the constraints of the parties involved are compatible. This results in more information than necessary being revealed.

Another approach would be for the parties to identify a mutually-trusted third party and for all disclosures to be made to that third party, who would then be able to highlight conflicting areas. The problems with this approach, however, include the difficulty of identifying a mutually trusted third party and the associated costs and time delay in locating, hiring and briefing a suitable third party.

SUMMARY OF THE INVENTION

The present invention attempts to overcome at least some of the problems associated with prior approaches. It is desired to allow parties to enter and share constraints in a secure way directly with each other, and to determine if the constraint sets are consistent with each other. If they are not, the present invention aims to allow the parties to determine which of their constraints result in the inconsistency, and optionally to allow at least one party to reveal these constraints to the other party as a basis for negotiating appropriate changes to the co-operative process.

According to one aspect of the present invention, there is provided a method of determining the compatibility of respective information associated with at least two parties, the method comprising: a first and second party each expressing their respective information in an agreed format; processing the information according to a two-phase double-encryption process, in which the first party encrypts their information under a personalised first-phase procedure and sends the results to the second party and the second party encrypts their information under a personalised first-phase procedure and sends the results to the first party, the second party encrypting the encrypted information received from the first party under a personalised second-phase procedure to produce a double-encrypted result and the first party encrypting the encrypted information received from the second party under a personalised second-phase procedure to produce a double-encrypted result, the first- and second-phase procedures being chosen such that a given element of information will always yield the same unique double-encrypted result regardless of which party it originates from; and comparing each party's double-encrypted information to determine the compatibility of the information of each party.

Preferably, the first and second parties are each allocated a key unique to that party, such that the first- and second-phase encryption procedures are personalised through the use by each party of the unique key.

Conveniently, under the first-phase procedure each party uses their unique key in conjunction with a first-phase function common to both the first and second parties and in the second-phase procedure each party uses their unique key in conjunction with a second-phase function common to both the first and second parties.

Alternatively, both the first and second parties use a function unique to each party in conjunction with the unique key in both the first- and second-phase procedures.

Advantageously, the information comprises a constraint. A constraint typically places a restriction on some aspect of the information defining what is acceptable to the party.

Preferably, the constraint comprises a constraint title. Conveniently, the constraint title is used to identify double-encrypted information in determining the compatibility of the information of both the first and second parties.

Conveniently, under the first-phase procedure each party assigns a unique label to the encrypted information.

Advantageously, determination of the compatibility of information comprises indicating whether any information is in conflict.

Preferably, determination of the compatibility of information comprises indicating which information is compatible.

Conveniently, determination of the compatibility of information comprises identifying that all information is compatible.

Advantageously, the results of the determination of information compatibility are used to determine if a link may be formed between the first and second parties.

The method may conveniently be used where there are more than two parties involved.

According to another aspect of the invention, there is provided a method of providing information of at least two parties suitable for comparison in a secure way, the method comprising a first and second party each expressing their respective information in an agreed format; processing the information according to a two-phase double-encryption process, in which the first party encrypts their information under a personalised first-phase procedure and sends the results to the second party and the second party encrypts their information under a personalised first-phase procedure and sends the results to the first party, the second party encrypting the encrypted information received from the first party under a personalised second-phase procedure to produce a double-encrypted result and the first party encrypting the encrypted information received from the second party under a personalised second-phase procedure to produce a double-encrypted result, the first-phase and second-phase procedures being chosen such that a given element of information will always yield the same unique double-encrypted result regardless of which party it originates from.

According to a further aspect of the present invention, there is provided a method of processing information into a form suitable for establishing the compatibility of the information with respect to at least two parties, the method comprising:

a first party expressing its information in a format agreed with a second party;

the first party processing information according to a two-step double-encryption process comprising:

encrypting its information under a personalised first-step procedure and sending the results to the second party for encryption by a second-step encryption process personalised to the second party and complementary to the first-step encryption process of the first party, to yield a double encrypted result;

receiving encrypted information from the second party;

encrypting the received encrypted information under a personalised second-step procedure to produce a double-encrypted result, wherein the received encrypted information has been encrypted using a first-step encryption process personal to the second party and complementary to the second-step encryption process of the first party;

the first-step and second-step encryption procedures being chosen such that a given element of information will always yield the same unique double-encrypted result regardless of whether it is processed using the first-step or second-step encryption process of the first party.

Preferably, the double-encrypted information of the first party is compared with the double-encrypted information of the second party to determine the compatibility of the information with respect to the first party and the second party.

Conveniently, the information comprises a constraint.

Advantageously, the constraint comprises a constraint title.

Preferably, the constraint title is used to identify double-encrypted information in determining the compatibility of the information of both the first and second parties.

Conveniently, determination of the compatibility of information comprises indicating whether any information is in conflict.

Advantageously, determination of the compatibility of information comprises indicating which information is compatible.

Preferably, determination of the compatibility of information comprises identifying that all information is compatible.

Conveniently, the results of the determination of information compatibility are used to determine if a link may be formed between the first and second parties.

Advantageously, under the first-step procedure the first party assigns a unique label to its encrypted information.

Preferably, the first party is allocated a key unique to the first party, such that the first-step and second-step encryption procedures are personalised through the use by the first party of the unique key.

Conveniently, under the first-step procedure the first party uses its unique key in conjunction with a first-step function common to both the first and second parties and in the second-step procedure the first party uses its unique key in conjunction with a second-step function common to both the first and second parties.

Advantageously, the first party uses a function unique to the first party in conjunction with its unique key in both the first- and second-step procedures.

A system working according to the method of the present invention determines the minimum necessary information for the two parties to share if semantic communication is to take place. This may lead to the establishment of a business relationship with the parties. It will also determine if communication can still take place assuming one or both parties insist on revealing no information. More generally, the present invention allows two or more parties to determine if two sets of constraints are compatible, without revealing the constraints to each other. If the sets are not compatible, it allows them to share the minimum subset required to be altered to achieve compatibility. Advantageously, they are able to maintain the confidentiality of their own process information without involving any third parties in the negotiations.

BRIEF DESCRIPTION OF THE DRAWINGS

In order that the present invention may be more readily understood, it will be now be described with reference to the accompanying drawings, in which.

DETAILED DESCRIPTION OF PRESENTLY PREFERRED EMBODIMENTS

Figure 1:
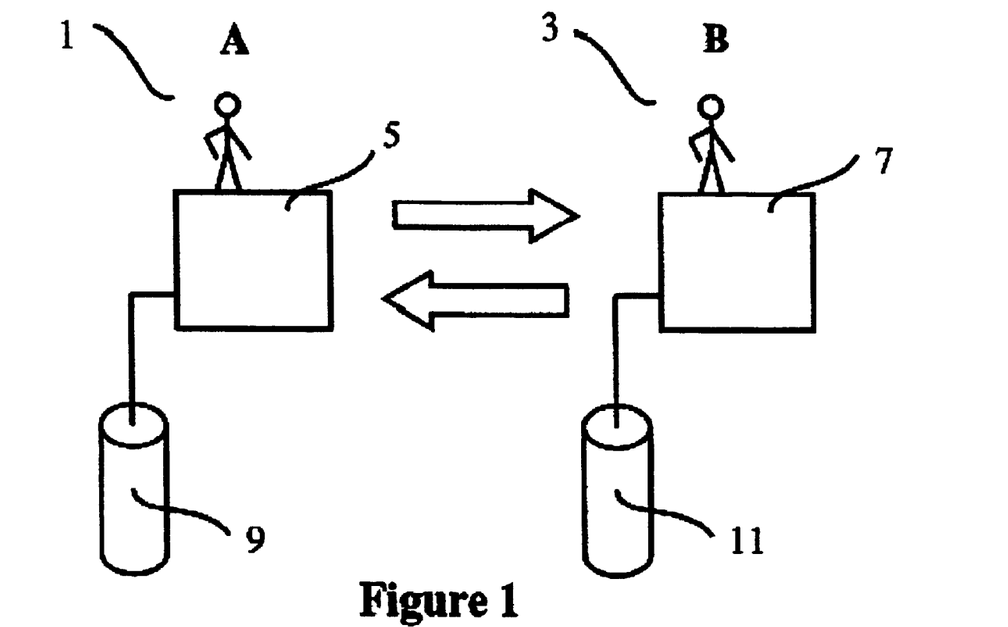
FIG. 1 is a schematic diagram showing a system embodying the present invention in which a process according to an embodiment of the present invention is implemented.

Referring to FIG. 1, an environment is shown involving two parties (A and B) 1, 3 who wish to communicate with each other. More specifically, each party 1,3 is in possession of a respective computer system 5, 7 and they wish for their systems to be able to communicate with each other. Each computer system has associated with it a respective memory store 9, 11 on which information secret to that party 1, 3 is stored. Parties 1, 3 wish to co-operate in a manner which involves working with the secret information in a secure way. More particularly, Party A 1 and Party B 3 wish for their respective computer systems 5, 7 to be able to establish semantic communications.

Although the environment described here relates to two parties, it is to be appreciated that the present embodiment may be used for more than two parties, and in particular has an increasing benefit without increasing complexity of the potential number of relationships involved, as will be explained later.

Figure 2:
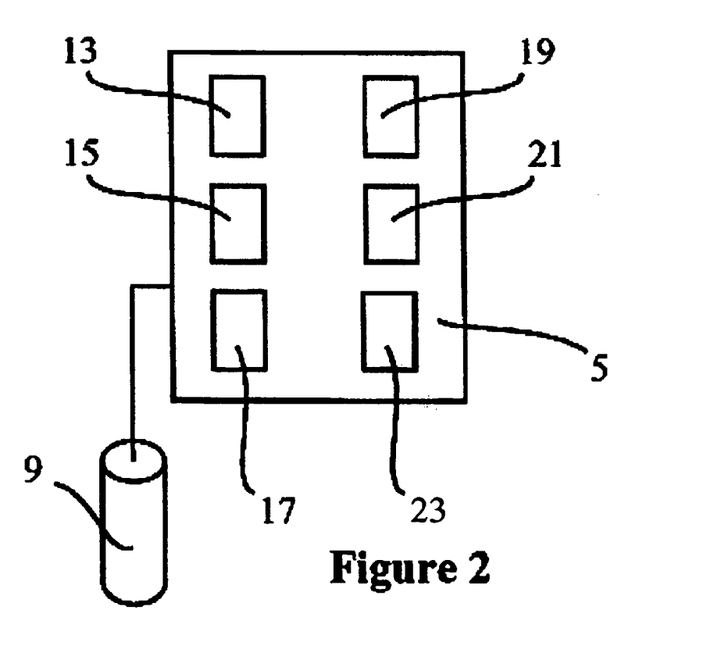
FIG. 2 is a schematic block diagram showing in greater detail an element of FIG. 1.

FIG. 2 illustrates some of the components of party A's computer system 5; Party B's computer system 7 has also its equivalent components. More specifically, each system 5, 7 comprises an encryption/decryption engine 13, an encryption/decryption algorithm 15 for use with the encryption/decryption engine 13, a communications module 17 for communicating with further systems, a random number generator 19 for use in implementing the encryption/decryption algorithm 15, a prime number generator 21 which is suitable for generating/selecting large "Sophie Germain" primes (i.e. prime numbers q where p=2q+1 is also prime) and a controller 23 for coordinating the workings of the various components of the system, as well as the previously-described memory store 9.

Figure 3:
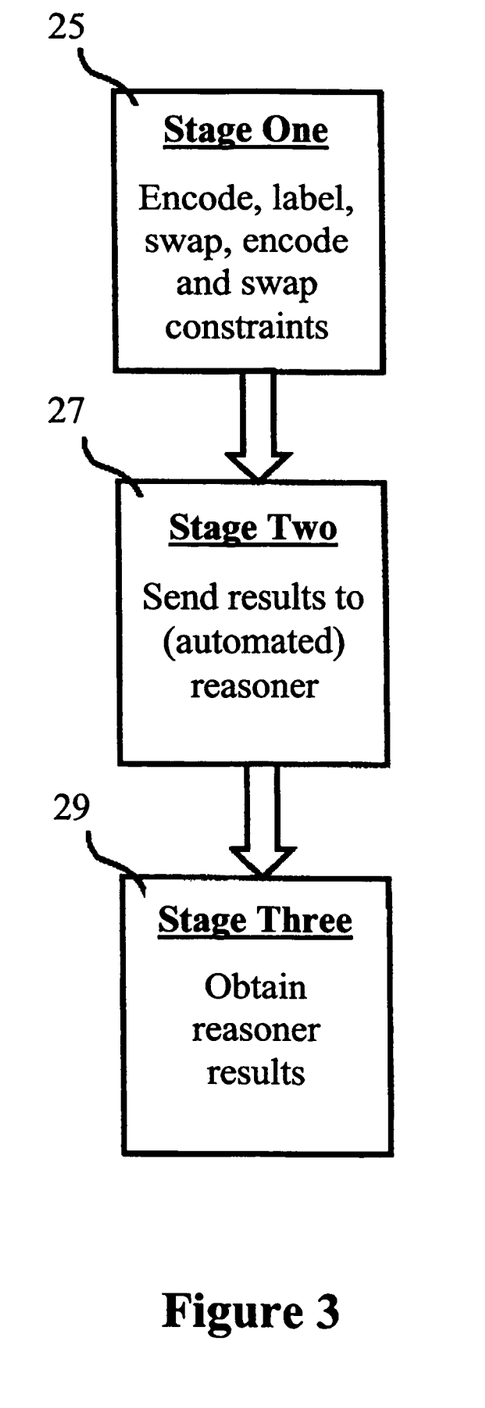
FIG. 3 is a flow-chart describing an overview of a process according to an embodiment of the present invention.

FIG. 3 is a flow chart giving an overview of a process according to the present invention. The process can be divided into three main stages, all three of which are discussed in greater detail hereinafter.

The stage one 25 of the process involves the parties encrypting, labelling, swapping, encrypting and returning information.

Stage two 27 involves taking the results of the first stage 25 and passing them to an automated reasoning component (referred to subsequently as the reasoner), based on FaCT (Fast Classification of Terminologies), RACER (Renamed ABox and Concept Expression Reasoner) or similar.

Stage three 29 involves looking at and acting upon the results output from the reasoner.

Figure 4:
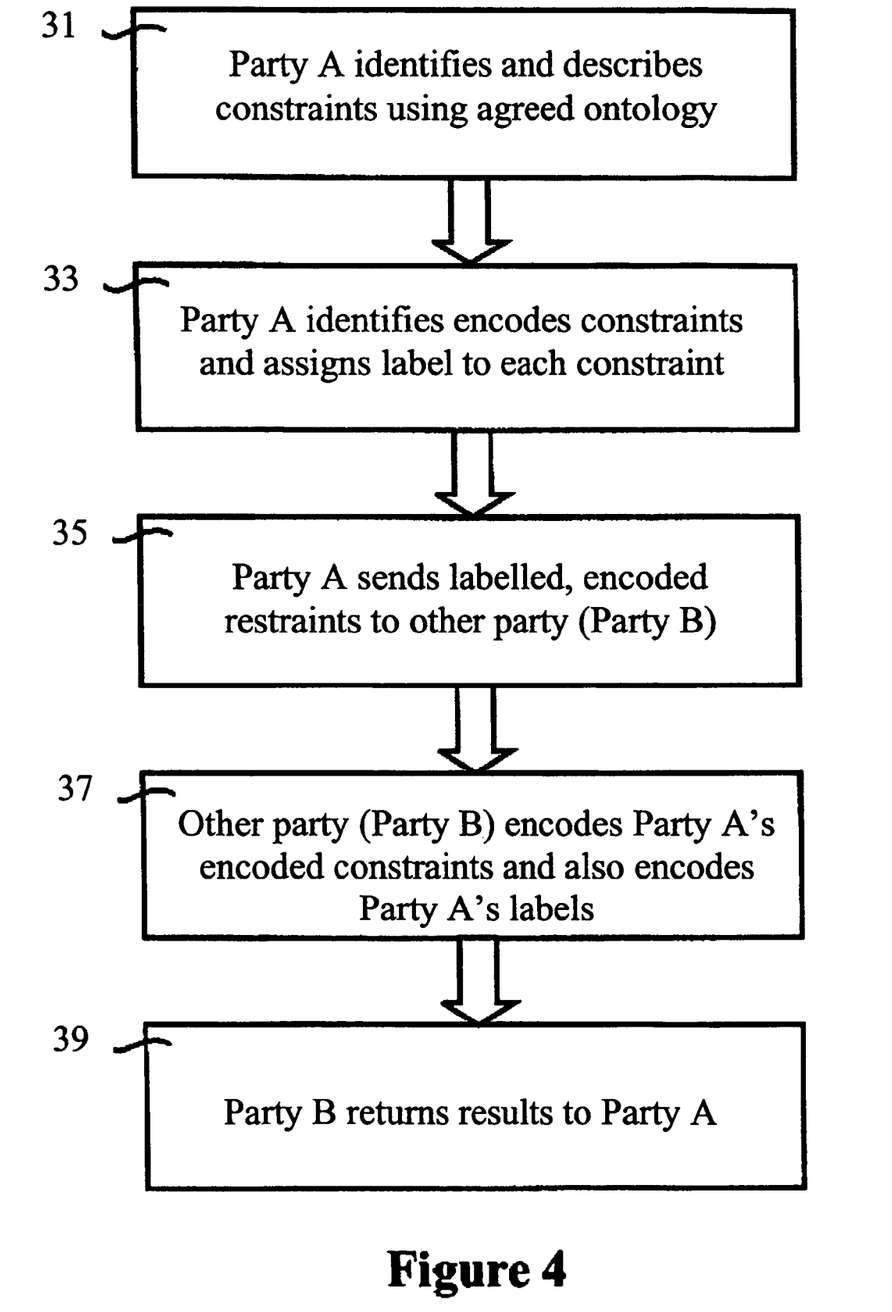
FIG. 4 is a flow chart showing in greater detail a first stage of the process of FIG. 3.

FIG. 4 illustrates in greater detail the actions performed on information stored by Party A on their system 5 in stage one 25 of FIG. 3.

The first stage commences with Party A identifying at a first step 31 the information (their constraints) on which they wish to conduct the process. Party A describes this information using a description language (ontology) which has been defined by the parties to the process. For example, the parties may elect to specify their information using semantic description logic language such as OWL (Web Ontology Language). However, other types of semantic description logic such as classical propositional logic, propositional modal logic or predicate logic could also be used. All that is required is for the logical language to include semantic terms e.g. a description or first-order language.

Party A then using personalised encryption techniques encrypts its information (which has been expressed in terms of the agreed ontology) and assigns readily readable unique labels to each encrypted constraint at a second step 33. In the course of the encryption, Party A maintains a look-up table which lists each constraint being encrypted against it's encrypted version.

The labelled and encrypted information (created at the second step 33) is then sent by Party A at a third step 35 to the other party to the process, namely party B. On receipt of this information, Party B using personalised encryption techniques encrypts at a fourth step 37 i) Party A's encrypted information and ii) Party A's labels. Party B also maintains a look-up table which lists Party A's labels against the encrypted version of each label.

Party B then at a fifth step 39 returns the result of the fourth step 37 to Party A. Party A is thus provided with a set of double-encrypted information with corresponding single-encrypted labels.

Party B undertakes an identical procedure to that described for Party A, save that in the third step 35 the encrypted information is sent to Party A, with Party A encrypting Party B's encrypted information and so forth.

Figure 5:
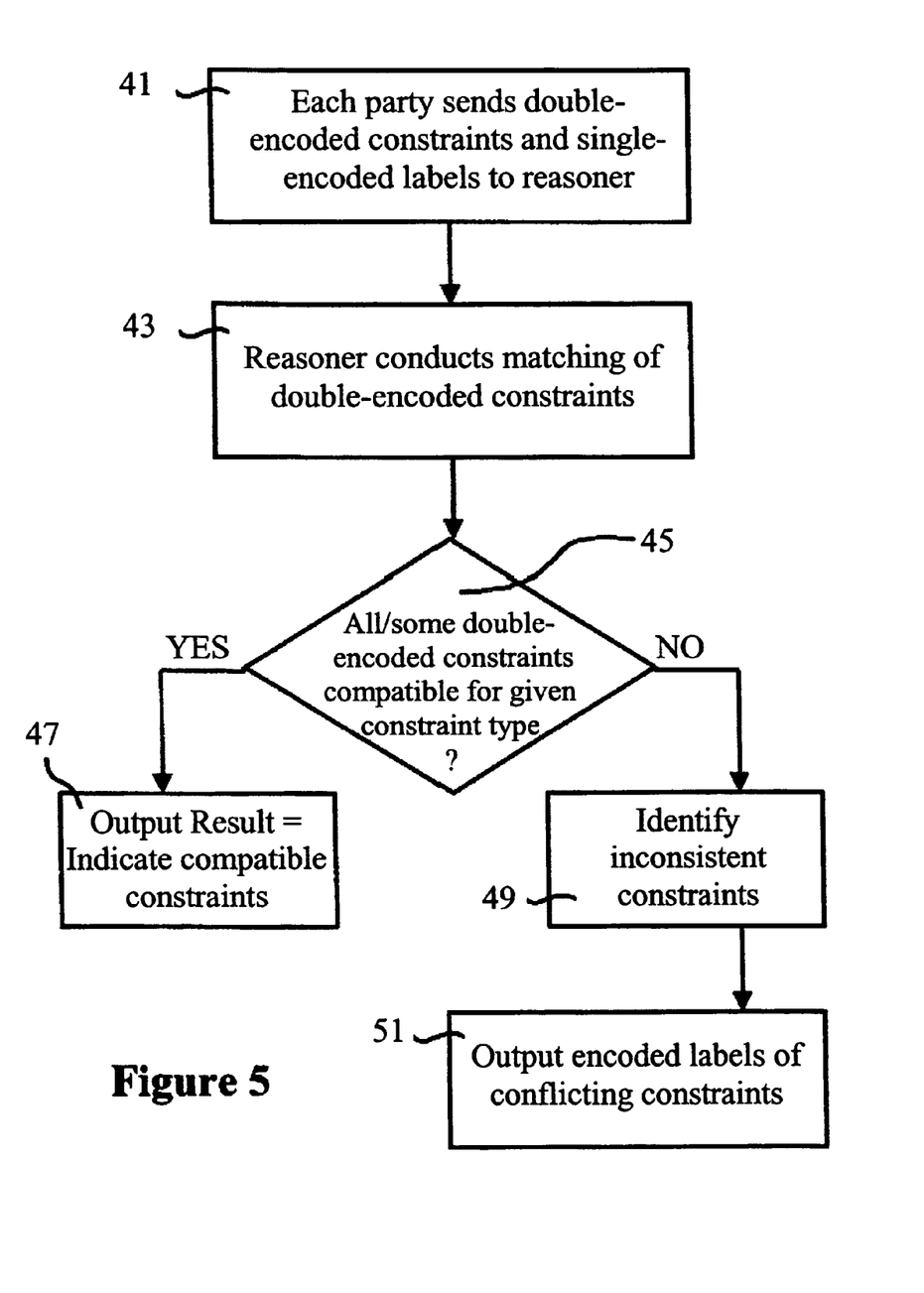
FIG. 5 is a flow chart showing in greater detail a second stage of the process of FIG. 3.

FIG. 5 illustrates in greater detail stage two 27 of FIG. 3.

More specifically, stage two 27 commences with each party sending the results of the first stage 27 (obtained in the fifth step 39) i.e. double-encrypted information and single-encrypted labels to an (automated) reasoner, based on FaCT or RACER or similar, at a sixth step 41.

The reasoner conducts a matching/compatibility assessment of the data input to it at a seventh step 43 for each type of double-encrypted constraint submitted to it e.g. car body length and determines at an eighth step 45 if all or at least some of the doubly-encrypted information input to it is compatible. If the answer is yes, the reasoner proceeds to a ninth step 47 and identifies outputs to the parties (double-encrypted) compatible constraints (or optionally, where all constraints match, the simple indication that all encrypted information (and hence all constraints) supplied to it is (are) compatible).

If, on the other hand, the reasoner determines at the eighth step 45 that none of the information supplied to it is compatible, the reasoner proceeds to a tenth step 49 and identifies the inconsistent information. The reasoner then proceeds to an eleventh sub-stage whereby the reasoner output the inconsistent information to Parties A and B at an eleventh step 51.

Figure 6:
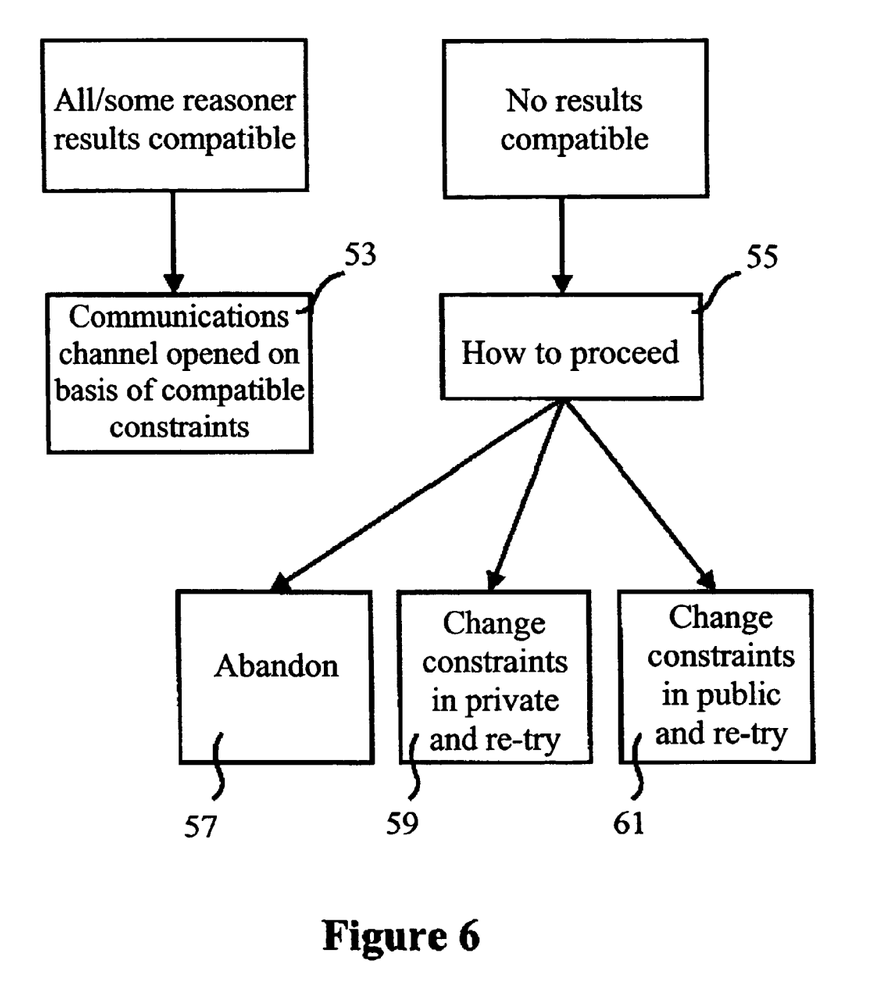
FIG. 6 is a flow chart showing in greater detail a third stage of the process of FIG. 3.

FIG. 6 shows in greater detail stage three 29 of the process of FIG. 3. If the reasoner has determined at the eighth step 45 in stage two 27 that all of the data input to it is compatible, a communications between party A and party B at a twelfth step 53 on the basis of the compatible constraints without either party having to reveal any of their constraints to the other party.

If, on the other hand, the reasoner has determined at the eighth step 45 of stage two 27 that none of the data input to it is compatible, then the parties agree as to how to proceed at a thirteenth step 55. One or both of the parties may find that the inconsistent area of information is something which cannot viably be changed, or is not worth changing to open the communications channel, in which case the parties proceed to a fourteenth step 57 and abandon the process.

Alternatively, the parties may proceed to a fifteenth step 59 and in private change some of their respective information. Once the changes have been made, the process reverts to stage one 25 of FIG. 3 and is repeated afresh with the intention that compatibility is found on the basis of the changed information. Where one party does not change any information, steps 1 to 5 may be omitted for that party provided that the result from stage 5 for that party's information has been saved.

As a further alternative, the parties may decide to proceed to a sixteenth step 61 whereby they reveal to the other side their respective areas of inconsistent information, optionally through the use of NDA's. This approach does have benefits over the approach of changing some information in private, in that the parties may find consistent information faster, but requires revealing information, albeit limited in scope solely to inconsistent information, to the other party.

It is to be appreciated that rather than returning a party's double-encrypted constraints and single-encrypted labels at the fifth step 39 each party could simply submit the results of the fourth step (i.e. the results of the other party) to the reasoner directly. Returning the double-encrypted constraints to the party in question does however permit either party to run the reasoner locally to check the results.

Through the use of the above-described process and an automated reasoner, the need for a trusted third party, with the associated cost, time and effort involved, is obviated.

A specific example of a system according to one embodiment of the present invention will now be described. We assume that two parties 1,3 are negotiating the format of a file to be used in future inter-party communication (for example, the format of an order from one party to the other.) The parties 1,3 wish to agree a format, but do not want to reveal what format they are able to handle except where absolutely necessary. Initially, they agree an ontology in which to define the file format as follows:

Concepts in Ontology:

MaxNumberOfLines ⊑ Integer
MaxLineLength ⊑ Integer
DataFormat ⊑ { integer, float, vector, string, boolean }

The two parties 1,3 agree a domain of discourse: this specifies all the concept and role names which can appear in constraints. The two parties 1,3 specify their constraints using description logic including number restrictions.

They are going to agree the maximum number of lines in the file, the maximum number of elements on each line (line length) and the possible data format of the elements. In reality, the ontology to agree the format would be far richer than this, but this suffices as an example.

In stage one 25 of the process, each party 1,3 prepares at the first step 31 a set of constraints, using the agreed ontology, (i.e. a constraint title e.g. "MaxNumberOfLines" and associated values, terms etc.) on the concepts they wish to agree.

Party 1 has Constraints:

MaxNumberOfLines ⊑ {64,...,256}
MaxLineLength ⊑ {64,...,128}
DataFormat ⊑ { integer, vector} i.e. Party 1 wishes to set a maximum number of lines between 64 and 256, a maximum number of elements between 64 and 128, and to constrain the data format of elements to be integer or vector. The range notation 64, . . . 256 is shorthand. In actual fact, the underlying description logic system would explicitly represent every number in the range as an atom i.e. an element of information to be encrypted.

Party 2 has Constraints:

MaxNumberOfLines ⊑ {64,...,256}
MaxLineLength ⊑ {32,...,64}
DataFormat ⊑ { float, string, Boolean } i.e. Party 2 wishes to set a maximum number of lines between 64 and 256, a maximum number of elements between 32 and 64, and to constrain the data format of elements to be float, string or Boolean.

Each party now uses their encrypting function (the nature of which is described hereinafter) to encrypt atoms within the constraints at the second step 33 of the process, and assigns a unique label to each constraint, also at the second step 33 of the process (in this example, encrypted results are shown as alphanumeric characters and symbols; the reason for this is that although all information would be processed as numbers, these numbers are usually represented as symbols using ASCII/UNICODE because it makes for shorter symbols).

Party 1 now has Labelled Constraints:

| | |
|---|---|
| Spzzx23rt ⊑ {p12d,...,kjw4} | -<p4> |
| Dfgtyu9iu ⊑ {p12d,...,3ed} | -<p12> |
| Rihser4$2 ⊑ { ytr905, 24rge4 } | -<p2> |

Party 2 now has Labelled Constraints:

| | |
|---|---|
| Fgyw3£er ⊑{kj89s,..,ty6re} | -<q11> |
| Ghre5$s2 ⊑{a2sdw,.., kj89s } | -<q21> |
| Wer4$£⊑ { 5ty7&, we2£$, io67y } | -<q8> |

The numerical values e.g. {64, . . . , 256} are represented by treating a numerical constraint such as in the range '64-128' as being equivalent to a member of the set {64, 65, 66, 67, . . . , 127, 128} and treating each number as an atom. This will be sufficient for the majority of constraints that are likely to be handled, provided that they are restrained to integers or some fixed-precision set of non-integers (e.g. 16.1, 16.2, 16.3 etc). Constraints which require less than, more than or range restrictions may be dealt with in this way. More mathematical constraints (such as a>5*b) could not however be handled in this way, and numbers appearing in them would not be encrypted.

The parties now send their constraints to each other (third step 35), and each encrypt the other party's constraints and their labels (fourth step 37). The parties maintain a lookup table of the results of the encryption of the labels.

Party 1 now has Party 2's Labelled Constraints in the Form:

| | |
|---|---|
| Ryu8$%s ⊑{ u8*de,..,nd$4} | -<q3fg> |
| Yrt5%jk ⊑{k14r3,.., u8*de } | -<m156> |
| Aw3£g ⊑{ xd46g, hae49, wvg5 } | -<bg3> |

Party 2 now has Party 1's Labelled Constraints in the Form:

| | |
|---|---|
| Ryu8$%s ⊑{u8*de,.., nd$4} | -<hj67> |
| Yrt5%jk ⊑{u8*de,.., gh4e3} | -<i6^> |
| Aw3£g ⊑{o9ty, 5ti9* } | -<nmi34> |

Optionally, 'dummy' constraints of the same form as others, but using symbols outside the domain of discourse, may be added by either party to prevent pattern-matching on the structure of your own constraints as a means to generate a partial lookup table of the encryption function.

In this example, simply for convenience of illustration, the constraints of both parties have been put in the same order e.g. "MaxNumberOfLines" first followed by "MaxLineLength" second and "DataFormat" third, meaning that after the parties have encrypted their constraints and swapped them, Party 1 may be able to discern that Party 2 encrypts "MaxNumberOfLines" as "Fgyw3£er", for instance. In practice, neither party will know the order in which the constraints of the other party has been written in, and in any event it may not be important to hide the constraint terms, such as "MaxNumberOfLines", rather only the actual data. However, if there is a concern of parties discerning information in this way (e.g. if both parties are using a shared constraint template list), then the order of the constraints could simple be shuffled before sending to the other party e.g. "DataFormat" first followed by "MaxNumberOfLines" etc. However it is important to note that even though a party may be able to discern that the other party encrypted "MaxNumberOfLines" as "Spzzx23rt", this will not help in any way to discern the manner in which a party encrypts information and thus determine the meaning of any other constraints. This relies on the difficulty of solving the discrete logarithm problem (for large enough p and q).

Once each party has encrypted the encrypted constraints of the other party and its labels, each party then returns the double-encrypted constraints to their original owners (fifth step 39). Again, in the event of a shared template for instance, it may be desirable to shuffle the order of the double-encrypted constraints so that a given party is prevented from identifying what their encrypted constraint and label has been encrypted as by the other party. From a practical standpoint, however, knowing this information (i.e. what their encrypted constraint and label has been encrypted as by the other party) will not reveal any information of genuine use about the encrypting function or any of the other data being hidden.

It is however important to note that after the double-encrypting of the constraints has been performed (i.e. first encryption by the party describing their constraints followed by second party encryption of the result) like terms appear like—for example, the terms "u8*de" and "nd$4" appear in both parties constraints. For simplicity, the order of the terms e.g. "MaxNumberOfLines" and "MaxLineLength" and their atoms has been preserved, and so we can for example see that "u8*de" and "nd$4" correspond to the constraints of 64 and 256 respectively which were set by both parties as their "MaxNumberOfLines" constraint. So, the result of a double-encrypted constraint is the same, regardless of whether it was first encrypted by party A or by party B.

Once the double-encrypted constraints (with single-encrypted labels) have been returned to their original owners, either or both parties 1,2 submit the combined set of constraints to a constraint reasoner (sixth step 41). In our example, this reasoner will be a description logic reasoner based on FaCT or RACER or similar.

The reasoner conducts a matching/compatibility assessment of the data input to it (seventh step 43) and checks to see if the constraints are compatible (eighth step 45). The reasoner is able to do this, without having to decode any of what is submitted to it, as once double-encrypted like constraint values will appear the same, e.g. "u8*de" and "nd$4" for 64 and 256 respectively in the example described above.

For any given constraint type, e.g. "MaxNumberOfLines" submitted to the reasoner, there are three possible outputs from the reasoner.

Firstly, all (double-encrypted) constraints submitted by each party could match i.e. each party is able to handle each and every constraint value held by the other, and only those constraint values (or, where each party only submits one constraint value for each constraint type, those constraint values are the same) e.g. MaxNumberOfLines ⊑{64, . . . , 256} in the present example Secondly, none of the values submitted by either party may match e.g. DataFormat ⊑{integer, vector} and DataFormat ⊑{float, string, Boolean} in the present example.

Thirdly, where more than one constraint type is submitted, some (but not all) of the constraint values may match e.g. MaxLineLength ⊑{64, . . . , 128} and MaxLineLength ⊑{32, . . . , 64} in the present example.

In the first and third instances i.e. where all or some of the constraints match, the reasoner outputs the consistent (double-encrypted) results with an indication that the outputted results are consistent (where all constraints match the reasoner may simply state the fact rather than identifying all of the matching double-encrypted values).

In the second instance i.e. where no constraints match the reasoner indicates the same by way of an output to the parties.

In summary, if the constraints are incompatible, the reasoner returns minimal sets of constraints which are inconsistent. If the constraints are compatible, but some constraints require restricted application to maintain consistency, then the restricted forms of those constraints can be returned.

In the case of the present example, the reasoner finds that certain constraints are not consistent, and determines that the constraints labelled <bg3> and <nmi34> are contradictory.

Each party checks the (encrypted) label of the constraints in these sets. If the label appears on their lookup table, they reveal the original label to the other party, allowing that party to know which constraint(s) is causing problems. In this example, partner 2 is able to identify that <nmi34> is constraint <p2> and thus to identify <p2> to partner 1 as a "problem" constraint. Similarly, partner 1 will be able to identify that <bg3> is constraint <q8> and thus to identify <q8> to partner 2 as a "problem" constraint.

The partners now have 3 options; (a) they can give up (fourteenth step 57) (b) they can make concessions in private (fifteenth step 59), re-encrypt the new set of constraints and repeat the process or (c) they can reveal the problem constraints to each other (sixteenth step 61) and discuss how to resolve the problem. We will assume they take course (c). Partner 1 reveals that constraint <p2> is:

DataFormat ⊑{integer, vector}

Partner 2 reveals that constraint <q8> is:

DataFormat ⊑{float, string, Boolean}

The two parties discuss the issue, and decide on a compromise:

DataFormat ⊑{integer, string}

Running the reasoner again (with a double-encrypted form of the new constraint in it) determines that the constraints are now consistent (ninth step 47). The reasoner returns the following definitions, which indicate (in double-encrypted format) what constraints may be used:

---

Yrt5%jk ⊑{u8*de }
Ryu8$%s ⊑{u8*de,..., nd$4}
Aw3£g ⊑{ o9ty, hae49 }

---

By co-operating, the two parties 1,3 are able to decrypt these. Using their look-up tables they must match them against the double-encrypted set of constraints they hold from the other party, and 'decode' the relevant concepts back into the single encrypted form. For example, Party 2 will be able to decode the above into:

---

Spzzx23rt ⊑{p12d,...,kjw4}
Dfgtyu9iu ⊑{p12d}

---

This can then be passed to Party 1 who again using their look-up tables can decode these constraints back into their original form, giving:

---

MaxNumberOfLines ⊑{64,...,256}
MaxLmeLength ⊑{64}
DataFormat ⊑{ integer, string }(in fact as this as has been agreed the parties will not need to decode constraints to know this)

---

Hence, the parties set the maximum line length to be 64, and the maximum number of lines to be 256. (Any other number in the range 64 . . . 256 would also be acceptable to both parties.) They have successfully negotiated conditions while revealing a minimum of information—it has not been necessary for either party to indicate the full range of Max Line Lengths which they are able to deal with, for example.

In an alternative embodiment, the parties do not apply labels (although they do encrypt, swap and encrypt constraints as before). The result is submitted to a reasoner, which performs matching and then simply outputs consistent double-encrypted constraints, e.g. the output from the example above would be:

---

Yrt5%jk ⊑{u8*de }
Ryu8$%s ⊑{u8*de,..., nd$4}

---

Which can be derived by the parties into the corresponding constraints using their look-up tables.

The reasoner also identifies double-encrypted constraints where there are no matches, but rather than identify these by the single-encrypted labels as above, the reasoner simply refers to the constraint by its double-encrypted constraint title e.g.

Aw3£g—ERROR, NO MATCHES

The parties are able to derive the meaning of this title using their look-up tables and can then either abandon the process, amend in private and re-try or amend by disclosing to each other as described above.

Although the above the process has been described above with parties using look-up tables to decrypt constraints, the use of look-up tables could be avoided if invertible functions and an invertible method for numerical representation were used.

As has been mentioned before, the present invention can also be used (and, in fact, is more valuable) in an environment where more than two parties wish to negotiate a set of constraints. If M parties wish to negotiate a set, then Party i (i less than M) pass their single encrypted constraints to Party i+1 i.e. each party passes their single encrypted, (optionally) labelled constraints to the "next party along" for encryption by that party (Party M passes their encrypted, optionally labelled constraints to Party 1). The double-encrypted constraints are then combined and then passed to a reasoner. Otherwise, everything proceeds as in the two-party case.

There now follows a worked mathematical example of a method of constraint resolution according to one embodiment of the present invention.

Assume we have two parties, Party 1 and Party 2, wherein each party has a system 5,7 as shown in FIGS. 1 and 2, each with constraints as follows:

Party 1 has constraints X=A, B or D; and

Party 2 has constraints X=B, C or D.

They wish to determine which of their constraints are compatible.

They mutually pick a Sophie Germain prime q=53 with p=2q+1=107 (p also prime) using the prime number generator 21 of the system 5,7 of one of the parties. They now need to pick a generator g. Using the random number generator 19 of one of the parties they pick a random number in $Z\_p$ (i.e. between 1 and p-1), say 24, and let the generator g=24^2 mod 107=41. (24 i.e. the random number is squared to ensure that g in fact generates the subgroup of order q in $Z\_p$.)

The two parties now represent their constraints (A,B,C,D) as numbers in $Z\_p$, for example, constraint title X=1 and constraint value A=27, B=11, C=8 and D=14. A common (but not unique) way of doing this is to use the binary number representing the constraint string, provided this is small enough. Alternatively (and more securely), a hash function can be used, and the parties maintain a lookup table to allow reversing the function.

Now Party 1 uses the random number generator 19 of their system to pick a secret key k1 randomly from Z_q (i.e. 1 to q; strictly speaking, k1 should be chosen from 1 to q-1), say k1=6. Party 2 uses the random number generator 19 of their system to pick a secret key randomly from Z_q, say k2=12 (all the constraints and keys have been chosen to be relatively small for the purposes of this example to avoid large exponentiations).

In one embodiment of the present invention, the system also requires two functions F and F' with the following properties: F takes as input a key K as well as the atom A to be encrypted, both of which are in Z_q, and produces an output in Z_p. F' takes as input key K' in Z_q and an element of Z_p (which will in fact be an output of F), and produces as output an element in Z_p. F and F' have the property that: F'(K1,F(K2,A))=F'(K2, F(K1,A)) i.e. if you apply both functions F and then F', each with a different key, it doesn't matter which key is used with which respective function, the result will be the same. An example of such a pair of functions F and F' are F(K1,A)=g^A K1 mod p, where p is a large prime, and F'(K2, F(K1,A))=F(k1,A)^K2 mod p. Party 1 encrypts all atoms in their constraint set using F(k1,A) where k1 is Party's randomly-chosen key and Party 2 uses F(k2,A) where k2 is party2's randomly-chosen key.

Party 1 encrypts his constraints using a first-phase function common to both Party 1 and Party 2 in conjunction with the key k1 which is unique to Party 1 as follows:

Constraint value A=27 is encrypted as g^(A.k1) mod p=41^(27.6) mod 107=13

Constraint value B=11 is encrypted as 41^(11.6) mod 107=100

Constraint value D=14 is encrypted as 41^(14.6) mod 107=48

Constraint title X=1 is encrypted as 41^(1.6) mod 107=62

Party 2 encrypts his constraints using k2:

Constraint value B=11 is encrypted as g^(B.k2) mod p=41^(11.12) mod 107=49

Constraint value C=8 is encrypted as 41^(8.12) mod 107=44

Constraint value D=14 is encrypted as 41^(14.12) mod 107=57

Constraint title X=1 is encrypted as 41^(1.12) mod 107=99

Parties 1 and 2 exchange their values.

Party 1 received 99 ⊑(49,44,57)

Received encrypted constraint 49 is encrypted as 49^k1 mod p=49^6 mod 107=33

44 is encrypted as 44^6 mod 107=37

57 is encrypted as 57^6 mod 107=41

99 is encrypted as 99^6 mod 107=101

Party 2 received 62 ⊑(13,100,48)

13 is encrypted as 13^12 mod 107=23

100 is encrypted as 100^12 mod 107=33

48 is encrypted as 48^12 mod 107=41

62 is encrypted as 62^12 mod 107=101

The results 101 ⊑(33,37,41) and 101 ⊑(13,33,41) are sent to a constraint solver, and the constraints in common are found to be 101 ⊑(33,41).

Party 1 finds that (33,41) corresponded to (49,57) and sends these to Party 2. Party 2 finds that (33,41) corresponded to (100,48) and sends these to Party 1.

Party 1 and Party 2 now find that their constraints in common are X=B and X=D. They have no knowledge of the other party's other constraints.

In this example, only one constraint type, X, was being compared between the parties, so in actual fact it would not be necessary to have double-encrypted X and submitted the result; rather, all that was required was for the parties to submit twice encrypted constraint values. Where parties wish to compare a number of constraint types (as will often be the case), however, it is economic of resources to also submit twice-encrypted constraint titles, and optionally also single-encrypted labels, so that the reasoner can identify and compare double-encrypted constraint values for a given constraint title, and thus compare a variety of constraint types in a single reasoning session.

In practice, the Sophie Germain prime q will be around 1024 bits long to adequately protect highly confidential constraints. The constraints could be converted to numbers in Z_q via a hash function (e.g. SHA-1) for instance (i.e. constraint A would be represented by Hash(A) mod q).

In this example, both parties apply the same "first phase" function:

$$F(\text{key}, \text{atom}) = g^{(\text{atom.key})} \mod p$$

to the atoms (e.g. A,B) to be encrypted using different keys (k1, k2) unique to that party. After the parties have labelled their encrypted constraints and exchanged their labelled, encrypted constraints, they then each apply the same "second phase" function:

$$F'(\text{key'}, F(\text{key}, A)) = \text{Received encrypted constraint}^{k'} \mod p$$

to the other party's encrypted labelled constraints where key' is the unique key of the second-phase encrypting party. In this example, the second phase function is slightly different to the first phase function, but they can be thought of as related encrypted functions.

The first and second phase functions are selected so that the resultant "double-encrypted" constraints appear the same wherever the original input is the same i.e. where A=B the double-encrypted result corresponding to A and B will be the same. Whether Party 1 or Party 2 first or second encrypts a constraint is immaterial, the overall process is commutative such that F'(k1,F(k2,A))=F'(k2,F(k1,A) i.e. the eventual double-encrypted result will be the same for a given constraint regardless of which party encrypts it first.

There is a different way of achieving this "overall commutative process" result, whereby each of two parties to the process has their own unique key (K1 and K2 respectively) and their own, unique function (F and F' respectively) which is applied in both the first and second phases, where F'(K1,F(K2,A))=F(K2, F'(K1,A)).

More generally, what is required is F'(K1,F(K2,A))=G'(K2,G(K1,A) where either

F'=G' and F=G; parties have own keys and apply same first functions and same second phase functions; or F'=F and G'=G; parties have their own keys and own function, that function applied by the respective party in both first and second phases.

Having described aspects of embodiments of the present invention it is to be appreciated that the above described embodiments are examples only and can be varied in accordance with the knowledge of the skilled addressee without departure from the spirit and scope of the invention as set forth in the appended claims.

The invention claimed is:

1. A method of determining a compatibility of at least a first party and a second party, each of said parties comprising at least one computer processor, the method comprising:
sending, with the first party, encrypted constraints enforced by the first party to the second party, each said constraint enforced by the first party having been separately encrypted under a first-phase procedure personalized to the first party;
sending, with the second party, encrypted constraints enforced by the second party, each said constraint enforced by the second party having been separately encrypted under a first-phase procedure personalized to the second party;
separately encrypting, with the second party, each of the encrypted constraints enforced by the first party under a second-phase procedure personalized to the second party to produce a first set of double-encrypted constraints;
separately encrypting, with the first party, each of the encrypted constraints enforced by the second party under a second-phase procedure personalized to the first party to produce a second set of double-encrypted constraints; and
determining whether said first party may establish a communication link with said second party based on a comparison of the first set of double-encrypted constraints with the second set of double-encrypted constraints.

2. A method according to claim 1, wherein the first and second parties are each allocated a key unique to that party, such that the first-phase and second-phase encryption procedures are personalised through the use by each party of the unique key.

3. A method according to claim 1, wherein each said constraint comprises a constraint title.

4. A method according to claim 3, wherein the constraint title is used to identify each double-encrypted constraint in determining the compatibility of the constraints enforced by the first and second parties.

5. A method according to claim 1, wherein under the first-phase procedure each party assigns a unique label to the constraints being encrypted.

6. A method according to claim 1, wherein determination of whether said first party may establish a communication link with said second party comprises indicating whether any conflicts exist between said constraints enforced by said first party and said constraints enforced by said second party.

7. A method according to claim 1, wherein determination of whether said first party may establish a communication link with said second party comprises indicating which constraints are compatible with each other.

8. A method according to claim 1, wherein determination of whether said first party may establish a communication link with said second party comprises identifying that all said constraints are compatible with each other.

9. A method of securely comparing constraints enforced by at least a first party and a second party, each of said parties comprising at least one computer processor, the method comprising:
sending, with the first party, encrypted constraints enforced by the first party to the second party, each said constraint enforced by the first party having been separately encrypted under a first-phase procedure personalized to the first party;
sending, with the second party, encrypted constraints enforced by the second party, each said constraint enforced by the second party having been separately encrypted under a first-phase procedure personalized to the second party;
separately encrypting, with the second party, each of the encrypted constraints enforced by the first party under a second-phase procedure personalized to the second party to produce a first set of double-encrypted constraints;
separately encrypting, with the first party, each of the encrypted constraints enforced by the second party under a second-phase procedure personalized to the first party to produce a second set of double-encrypted constraints; and
the first-phase and second-phase procedures being chosen such that a given element of information will always yield the same unique double-encrypted result regardless of which party it originates from; and
determining whether said constraints enforced by each of said first and second parties allow said first party to establish a communication link with said second party according to a degree to which said first set of double-encrypted constraints is similar to said second set of double-encrypted constraints.

10. A method according to claim 9, wherein each said constraint comprises a constraint title.

11. A method according to claim 10, wherein the constraint title is used to identify each double-encrypted constraint in determining the compatibility of the constraints enforced by the first and second parties.

12. A method according to claim 9, wherein determination of the compatibility of information comprises indicating whether any conflicts exist between said constraints enforced by said first party and said constraints enforced by said second party.

13. A method according to claim 9, wherein determination of the compatibility of the constraints enforced by said first and second parties comprises indicating which constraints are compatible with each other.

14. A method according to claim 9, wherein determination of the compatibility of the constraints enforced by said first and second parties comprises identifying that all said constraints are compatible with each other.

15. A method according to claim 9, wherein the results of the determination of the compatibility of the constraints enforced by said first and second parties are used to determine if a link may be formed between the first and second parties.

16. A method according to claim 9, wherein under the first-phase procedure the first party assigns a unique label to its encrypted information.

17. A method according to claim 9, wherein the first party is allocated a key unique to the first party, such that the first-phase and second-phase encryption procedures are personalised through the use by the first party of the unique key.

18. A method of establishing communication between a first computing device and a second computing device in accordance with first and second sets of constraints enforced by said first and second computing devices, respectively, said method comprising:
said first computing device providing an encrypted version of said first set of constraints to said second computing device together with an unencrypted set of constraint titles associated with said first set of constraints;
said second computing device providing an encrypted version of said second set of constraints to said first computing device together with an unencrypted set of constraint titles associated with said second set of constraints;

said first computing device encrypting said encrypted version of said second set of constraints to produce a double-encrypted version of said second set of constraints;

said second computing device encrypting said encrypted version of said first set of constraints to produce a double-encrypted version of said first set of constraints; and generating in each of said first and second computing devices a governing set of constraints for a link between said first and second computing devices based on identified matches between said double-encrypted versions of said first and second sets of constraints and said unencrypted sets of titles associated with said first and second sets of constraints.

19. The method of 18, in which said first computing device uses an encryption key separate from said encryption key used by said second computing device.

20. The method of claim 19, in which said keys are randomly generated.

21. The method of claim 18, in which an encryption process used by said first computing device to encrypt said constraints is functionally different than an encryption process used by said second computing device.

22. The method of claim 18, in which an encryption process performed by said first computing device is functionally equivalent to an encryption process performed by said second computing device.

23. The method of claim 18, in which said encryption process performed by said first computing device uses a key separate from a key used by said encryption process performed by said second computing device.

24. The method of claim 18, further comprising:
determining that none of said double-encrypted constraints enforced by said first computing device is equal to any of said double-encrypted constraints enforced by said second computing device; and
changing one or more of said constraints;
updating said double-encrypted versions of said first and second sets of constraints; and
reattempting to generate said set of governing constraints.

25. The method of claim 18, further comprising:
determining that none of said double-encrypted constraints enforced by said first computing device is equal to any of said double-encrypted constraints enforced by said second computing device; and
said first computing device negotiating directly with said second computing devices to at least partially generate said set of governing constraints.

26. The method of claim 18, further comprising:
determining that none of said double-encrypted constraints enforced by said first computing device is equal to any of said double-encrypted constraints enforced by said second computing device; and
preventing said first computing device from establishing a link with said second computing device.

27. The method of claim 18, in which each said constraint comprises a constraint title defined by an ontology agreed upon between said first and second computing devices.

* * * * *